Feb. 15, 1927.  V. A. FYNN  1,617,802

NONSYNCHRONOUS MOTOR

Filed April 22, 1926

Inventor:
VALÈRE ALFRED FYNN,
By John H. Bruninga
His Attorney.

Patented Feb. 15, 1927.

1,617,802

UNITED STATES PATENT OFFICE.

VALÈRE A. FYNN, OF ST. LOUIS, MISSOURI.

NONSYNCHRONOUS MOTOR.

Application filed April 22, 1926. Serial No. 103,790.

My invention relates to methods and means for starting and operating polyphase non-synchronous induction motors.

I have heretofore disclosed certain polyphase induction motors with power factor control. In operating such motors I have discovered that when the power factor controlling circuits are kept closed at starting as well as in normal operation, the starting performance is adversely affected and full advantage is not taken of the possibilities of such motors. To remedy these defects I have opened the compensating circuits at starting, closing them only after the motor has reached a sufficient speed and have found that this procedure alone or when coupled with suitable departures from the usual manner of dimensioning the several motor circuits is capable of bringing about a markedly superior all around performance. These discoveries led me to work out an improved method of operation and means for carrying same into practice applicable to polyphase motors in general and to some types of such motors in particular, the results depending on how much of the method and means is made use of. Generally stated, in accordance with my invention I start and operate non-synchronous polyphase motors having a closed phase winding on the secondary, or a phase winding on that member which is adapted to be closed in any desired and known manner, by producing one revolving field to start the motor and another revolving field to operate the machine. These fields both revolve in the same direction and synchronously with respect to the primary of the motor, or to that element of the machine which is wound for connection to the full voltage of the supply, but the revolving field produced for operating the motor is so established as to be in closer inductive relation with the torque producing winding on the secondary than the revolving field produced for starting the motor. The revolving field produced in normal operation takes the place of part, or of the whole, of the revolving field used at starting.

My invention in one of its embodiments comprises a method of starting and operating the above mentioned type of motors which consists in part in producing the revolving field used at starting from the primary and the revolving field used in normal operation from the secondary. This form of my method is preferably combined with phase compensation, i. e. power factor control, in normal operation.

In another form of my invention I make use in combination with and as a part of the method above outlined, of a closed, or adapted to be closed, phase winding on the secondary which is so dimensioned that if used with the revolving field produced at starting, it would give less than the maximum rated torque of the motor, but when used with the revolving field produced in normal operation it yields a greater maximum torque bringing the total torque of the motor in normal operation up to the rated maximum torque of the machine. One way of achieving this result is to increase the resistance of the secondary phase winding above the value which would be used in a corresponding polyphase asynchronous machine of ordinary design and to reduce the leakage between these secondary torque producing circuits and the circuits producing the revolving flux used in normal operation below the value usual or possible in the ordinary design of such motors. The changes necessary for producing first the starting and then the operating revolving fields can be carried out automatically or by hand.

My invention permits of starting a polyphase induction motor by connecting it directly to the supply without starting resistances or so called compensators and with less current than that taken under like conditions by corresponding motors of usual make, or it permits of starting such motors as described and of controlling their power factor, or it permits of starting such motors with less current and more torque than the current taken and the torque yielded by polyphase motors of ordinary design operated under like conditions. This improved starting performance may or may not be coupled with means for controlling the power factor of my improved motors.

The nature of the invention is fully set forth in the specification taken in conjunction with the accompanying drawings and is particularly pointed out in the appended claims.

In the appended diagrammatic drawings, Fig. 4 is a detailed view of rotor and stator slots and of a possible relative location of the several windings on the rotor and stator of Fig. 1, while

Figure 1:
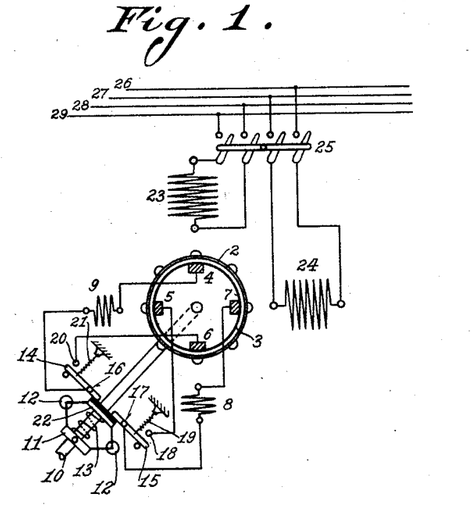
Figs. 1, 2 and 3 show different two-pole embodiments of the invention.
Figure 4:
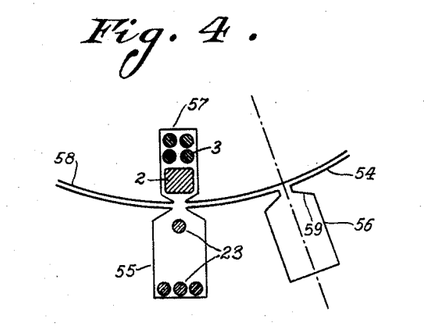

Referring to the drawings, Fig. 1 is a two-phase motor with stationary primary carrying the primary windings 23, 24 adapted to be connected to the two-phase supply 26, 27 and 28, 29 by means of the four pole switch 25. The rotor, here the secondary, carries a squirrel cage or other polyphase winding 2 and the commuted winding 3 with which cooperates a stationary two-phase arrangement of brushes comprising the two brush sets 4, 6 and 5, 7. The stator windings are preferably arranged in slots such as shown in Fig. 4 at 55, 56 and the same is true of the rotor windings. In Fig. 1 the commuted winding is located at the bottom and the squirrel cage winding at the top of the rotor slots 57 as shown in Fig. 4. The auxiliary windings 8 and 9 located on the stator are sources of auxiliary voltages and when connected to the brushes 5, 7 and 4, 6 they impress these auxiliary voltages on the commuted winding 3. The axis of the winding 8 is displaced by 90 electrical degrees from the axis of the brushes 5, 7 to which it is connected and the axis of 9 bears the same relation to that of the brushes 4, 6. The position of the commutator brushes with respect to the primary windings 23, 24 is immaterial but the angular relation between a brush axis and the corresponding auxiliary winding is of deciding importance. The circuit of each of the auxiliary windings 8 and 9 is controlled by an automatic switch. The switch blade 14 is in circuit with 9 and is pivoted at 16. The switch blade 15 is in circuit with 8 and is pivoted at 17. The automatic device controlling these blades comprises a collar 11 rigidly mounted on the motor shaft 10 or integral therewith, and a collar 22 slidably mounted on said shaft. These collars are forced apart by the spring 13 and are joined by means of articulated links carrying the weights 12. The collar 22 is adapted to at times contact with the rearward prolongations of the switch blades 14, 15 and force the latter out of touch with the contacts 18, 20 and against suitably located stops. With the motor at rest the spring 13 forces 22 into contact with the switch blades and overpowers the springs 19 and 21. The collar 22 is preferably faced with insulating material as shown in the figure. Springs 21 and 19 tend to close the circuits of 8 and 9 by bringing the switch blades 14, 15 into touch with the contacts 20, 18. When the shaft 10 revolves at a sufficiently high speed the centrifugal regulator 11, 12, 13, 22 comes into action, compresses spring 13, withdraws the pressure of 22 from the switch blades and leaves the latter in the control of the springs 19, 21 which then close the circuits of 8 and 9. It is advisable to so proportion the centrifugal regulator that in normal operation the collar 22 does not contact with the switch blades 14, 15.

Figure 2:
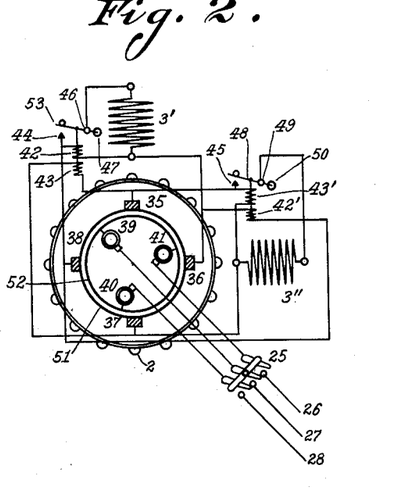

In Fig. 2 the primary 52 is located on the revolving member or rotor and consists of a delta connected three-phase winding provided with sliprings 39, 40, 41. Brushes cooperating with these sliprings and the three-pole switch 25 connect the primary to the three-phase supply 26, 27, 28. The secondary carries a squirrel cage or other polyphase winding 2 and the two phase windings 3', 3" which correspond to the commuted winding 3 of Fig. 1. The windings 3', 3" are adapted to be connected to two-phase auxiliary voltages. The source from which these voltages are here derived is the commuted winding 51 located on the primary. The two-phase arrangement of brushes 35, 37 and 36, 38 which cooperates with 51 is so located that the axis of the brushes 35, 37 is displaced by 90 electrical degrees from the axis of the secondary 3" to which said brushes are connected. Similarly the axis of the brushes 36, 38 is displaced 90 electrical degrees from the axis of 3'. The circuits of the secondary windings 3' and 3" are controlled by automatic electromagnetic switches the blades 53, 48 of which are pivoted at 46 and 49 respectively and normally held open against suitable stops by means of the weights 47 and 50. Coils 42, 42' and 43, 43' are permanently connected across the commutator brushes 36, 38 and 35, 37. Small cores depending from the blades 53, 48 reach down into the coils 42, 43 and 42', 43' respectively. When the current in these coils reaches a sufficient value the pull on the cores overpowers the weights 47, 50 and causes the blades 48, 53 to contact with the terminals 45, 44 thus impressing the two-phase auxiliary voltages derived from the source 51 on the secondary windings 3' and 3".

Figure 3:
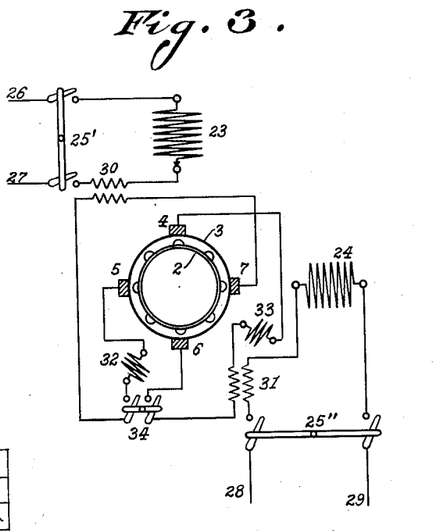

In Fig. 3 the primary, here the stator, of the motor carries the two phase primary windings 23, 24 adapted to be connected to the two-phase supply 26, 27 and 28, 29 by way of the switches 25' and 25". The secondary carries a squirrel cage or equivalent winding 2 and a commuted winding 3. The former is located in the bottom, the latter in the top of the rotor slots, the arrangement of these rotor windings being the reverse of that shown in more detail in Fig. 4. A two-phase arrangement of brushes 4, 6 and 5, 7 cooperates with the commuted winding. The brushes 4, 6 can be connected to the auxiliary stator winding 33 and the brushes 5, 7 can be connected to the auxiliary stator winding 32. The hand operated switch 34 controls these circuits. The axis of the winding 33 is displaced from the axis of the brushes 4, 6 by an angle other than 90 electrical degrees. The same is true of the axis of the winding 32 and of the axis of the brushes 5, 7. Variable impedances 30 and 31 are included in each brush circuit, they are in the form of series transformers with independent primary and secondary windings. One winding of the variable positive reactance 30 is connected in series with the primary 23, the other in circuit with the brushes 5, 7. One winding of the variable positive reactance 31 is connected in series with the primary winding 24, the other in circuit with the brushes 4, 6.

In Figs. 1, 2 and 3 the commutator brushes are shown as resting directly on the commuted windings with which they cooperate. All uncertainty as to brush position with relation to other elements of the motor is thus removed. In practice the brushes in question would usually rest on a commutator connected to the commuted winding.

Turning now to the mode of operating Fig. 1: with motor at rest, I first close switch 25 while the centrifugally controlled switches 14, 15 remain open. The machine starts like an ordinary squirrel cage polyphase induction motor. If the squirrel cage 2 or its equivalent is of low resistance, as is usual in ordinary polyphase motors in order to make it possible to make full use of the frame and of the active material of the machine and to secure a sufficiently high full load conversion efficiency, then the machine will take a large starting current and will develop a small torque per ampere. But the starting current will be less and the starting torque greater than if the circuits of the commutator brushes 4, 5, 6, 7 were allowed to remain closed. As the motor gathers speed the weights 12 of the centrifugal control fly out compressing spring 13 and allowing the switch blades 14, 15 to be pressed into contact with the terminals 18, 20 by the springs 19, 21. This action can be made snappy and timed to occur at practically any desired subsynchronous speed in a manner now well understood. As soon as the brush circuits on the secondary member are closed the auxiliary voltages impressed on the commuted winding 3 and derived from the auxiliary windings 8 and 9 may cause the power factor of the motor to improve. In order to achieve this desirable result it is necessary to properly excite the motor from its secondary and thus produce at least part of the revolving field of the motor, from the secondary instead of the primary. To this end the rotor produced revolving field must revolve synchronously with respect to the primary 23, 24 and its axis must at all times, substantially coincide with the axis of the stator produced revolving field. To accomplish this the two fields must first be made to revolve in the same direction and at the same speed. The direction of rotation of the rotor produced field is determined by the manner of connection between 8, 9 and the commutator brushes 4, 6 and 5, 7. Reversing the connections between one set of brushes and one of the windings 8 or 9 reverses the direction of rotation of the rotor produced field. The speed of rotation of this field depends on the periodicity of the currents actually introduced into the commuted winding 3 by the polyphase auxiliary voltages. To cause the rotor produced field to revolve at the same speed as the stator produced field this periodicity must be the same as the slip frequency of the currents induced or generated in the secondary member. Since, in Fig. 1, the source of the auxiliary voltages produces voltages of line frequency, the windings 8 and 9 acting as secondaries of a transformer the primaries of which are 23 and 24, it is necessary to insert a frequency changing device between the source 8, 9 of the auxiliary voltages and the secondary winding 3. In Fig. 1 this frequency changing device comprises the stationary commutator brushes 4, 5, 6, 7 and the commutator with which they cooperate. In order to get the axes of the two fields to coincide for any given position of the polyphase arrangement of commutator brushes it is necessary to locate the axes of the auxiliary windings 8 and 9 so that the axis of each winding is displaced by about 90 electrical degrees from the axis of the brushes to which said winding is connected. Speaking more generally the desired result will be achieved when the auxiliary line frequency voltage impressed on any one set of commutator brushes, as for instance on 4, 6, leads by about 90 degrees the working voltage of line frequency appearing at said brushes but generated as a voltage of slip frequency in 3 because of the asynchronous speed of the rotor.

The degree of phase compensation or of the improvement of the power factor depends on the magnitude of the rotor excitation or on the magnitude of the auxiliary voltages of proper phase impressed on the commutator brushes.

Taking no-load conditions and disregarding the reactance voltages due to the small primary and secondary current, when the revolving field of the motor is produced from the primary windings 23, 24 of Fig. 1 the voltage at the terminals of any one of said windings must be equalled and opposed by the vectorial sum of the ohmic drop in that winding and the voltage induced therein by the revolving field in question. One part $F'$ of this field is a leakage field in so far as the secondary 2 is concerned, it links with 23 and 24 but not with 2. The other part $F''$ links with 23, 24 as well as 2. Both $F'$ and F" induce terminal-voltage-opposing voltages in 23 and 24 but F" is the only part of the total revolving flux produced by the primary which cooperates in producing torque.

When the revolving field of the motor is produced from the secondary 3 it comprises one part $f'$ which links with 3 and 2 but does not link with 23 or 24; this is a leakage field in so far as the primary is concerned. The other part $f''$ of the said field links with 3, 2 and with 23, 24. In this case the necessary terminal-voltage-opposing voltages in 23 and 24 can only be induced by $f''$ but $f'$ as well as $f''$ are active in producing torque.

In order to eliminate all lagging magnetizing currents from 23 and 24 the rotor produced revolving flux must be of such magnitude that its component $f''$ equals the sum of F' and F". If the magnitude of the rotor produced revolving flux is increased beyond this point then the primaries 23, 24 begin to take leading demagnetizing currents so as to keep $f''$ down to the value required by the prevailing primary terminal voltage. If the power factor of the machine is not quite unity for $f''=\overline{F'+F''}$ a slight increase of the rotor exciting flux certainly brings it to unity and a further increase of said flux causes the motor to operate with leading power factor. It is best to so operate these motors that at least all lagging magnetizing currents are eliminated from the primaries which means that all of the said revolving flux of the motor is produced from the secondary.

Right here it is important to note that when in Fig. 1, and for that matter in any of the other figures, the rotor produced revolving flux of the motor is of a magnitude in which its component $f''=\overline{F'+F''}$, then the total rotor excitation $f'+f''$ is obviously greater than F". This means that for equal terminal-voltage-opposing voltages generated in the primaries 23, 24 the torque producing component of the total revolving flux is greater when said flux is produced from the secondary 3 than when produced by the primaries 23, 24.

One form of my new method, as applied to Fig. 1, therefore consists in producing the revolving field of the asynchronous induction motor there shown from the primary 23, 24 to start the motor and thereafter producing at least part of this field from the rotor by closing the suitably constituted rotor exciting circuits comprising the commuted winding 3, the commutator brushes 4, 5, 6, 7, and the sources 8, 9 of auxiliary voltages. In this case the closing in question is performed by the automatically controlled switches 14, 15.

In Fig. 1 the inductive relation between 23, 24 and 2 is not as good as the inductive relation between 3 and 2. The two first are separated by the air-gap necessary between rotor and stator and are located in different slots while 3 and 2 are located in the same slots. This difference as to inductive relation can be accentuated by using thicker lips 59 on the stator slots as shown for the slot 56 of Fig. 4, or by reducing the slot opening or mouth of the stator slots or in other known ways, but such expedients must be used cautiously and with moderation. If pushed beyond well defined limits they do more harm than good.

Figure 5:
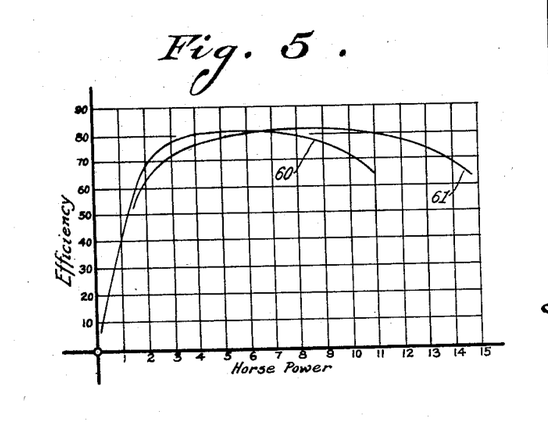
Fig. 5 is an explanatory diagram.

Now I have found, as just explained, that the extremely close inductive relation achieved by locating the rotor revolving flux producing or exciting winding 3 in the same slots with the induction motor torque producing winding 2, said torque being due to currents generated in 2 by the flux produced by 3 and coacting with said flux, increases the torque producing revolving motor flux for otherwise equal conditions and thus reduces the slip of the motor for a given resistance of 2. Furthermore if the auxiliary voltages are so chosen that near no-load the auxiliary voltages lead the working voltages in 3 by about 90 degrees, the secondary exciting currents, which lag more and more behind the auxiliary voltages as the slip increases, will add appreciably to the total useful torque of the motor as the load and therefore the slip increase. This further diminishes the slip for a given load. A smaller slip results in a smaller phase displacement in 2 for a given load which means a larger torque per ampere. These discoveries have led me to conceive the idea of further bettering the starting performance of such motors by increasing the ohmic resistance of the torque producing winding 2 on the secondary. In carrying this conception into practice I so dimension the winding 2 that, in case it is used as squirrel cage or as similar windings are always used in asynchronous motors, i. e. in conjunction with the windings 23 and 24 only, the maximum torque developed by the motor will be less than the maximum rated torque of the machine. Specifically referring to Fig. 1 I can, for instance, so dimension the winding 2 that the maximum torque the machine is able to develop when used as an ordinary squirrel cage motor, i. e. with windings 2, 23 and 24 only and with 3 on open circuit, corresponds to about 11½ brake horse power whereas the maximum rated torque of the machine corresponds to about 15½ brake horse power. Assuming that the rated full load of such a motor is 8 horse power then a squirrel cage of the selected resistance will develop about twice the full load torque at starting while taking about 3½ times the full load current when connected to the full line voltage without the interposition of any starting devices other than a switch. Yet when the revolving field is subsequently produced from the rotor instead of the stator, as shown in Fig. 1, the motor output will not only increase to its rated value but will yield this out-put at very nearly unity power factor throughout. This combination of high starting torque without undue starting current, i. e. of a high torque per ampere at starting when connecting the motor primary directly to the supply, with an output in normal operation which is considerably in excess of that which corresponds to the starting performance secured, is brought about by a change in the method of producing the revolving flux coupled with a method of dimensioning of the several windings involved which departs materially from the usual. The efficiency curves in Fig. 5 clearly show the effect of the method just described. Curve 60 corresponds to the output of the squirrel cage 2 of Fig. 1 when the revolving flux is produced by the primary windings 23, 24 and curve 61 represents the output of the motor with the same squirrel cage when the revolving flux is produced from the rotor by the winding 3. The starting performance according to this method of operation corresponds to the lower output curve 60 and is that much more desirable.

One advantage of this improved method is to make it possible to start, without starting devices of any kind and without objectionable disturbance of the supply, much larger squirrel cage or like motors than has heretofore been possible coupled or not with power factor control in normal operation. The starting devices herein referred to such as starting resistances or starting compensators, represent a large percentage of the cost of the motor and add very considerably to the cost and complication of the complete motor installation. The method herein described eliminates this expense and complication, if utilized in part it reduces the starting current down to values permitted by the several distributors of electrical energy, if utilized to a greater extent it reduces the starting current as before but also increases the torque per ampere at starting and when fully utilized it reduces the starting current to permissible values, increases the torque per ampere at starting and permits of the motor being operated at or about unity power factor throughout its range of loads. Another advantage of this method is that the only opportunity for a rush of current is at the time the motor is first connected to the line, the closing of the rotor exciting circuits produces no shock whatsoever. All these advantages are secured by the use of nothing but switches. If it is desired to nevertheless combine other starting devices with these improved motors this can of course be done and will result in a reduced cost of such starting devices to meet any given set of particularly difficult conditions.

It is of advantage to keep the commutator and brush gear on the rotor of Fig. 1 as small as possible. To secure the smallest possible commutator and associate windings and brushes included in the commutator circuits, it is necessary to provide some means for excluding all working currents from the winding 3. Since there is a slip between the member carrying the torque producing ampere turns, to which member I refer as the secondary, and the member connected to the supply, and to which member I here refer as the primary, then working voltages are generated or induced in winding 3 as well as in winding 2 on the secondary. One means of preventing these working voltages from sending appreciable working currents through 3 is to locate 3 in the bottom of the rotor slots so as to place the squirrel cage 2 between 3 and the air gap and between 3 and the primary windings 23, 24. This arrangement is shown in Fig. 1 and also in Fig. 4. When these or similar means are used to this end then the auxiliary voltages impressed on 3 can be pure exciting voltages leading the working voltages generated in 3 by about 90 degrees without 3 carrying any working currents.

If it is desired to allow 3 to carry working as well as exciting currents, thus further increasing the maximum torque or the efficiency of the machine then it is only necessary in Fig. 1 to impress on the commutator brushes auxiliary voltages which lead the working voltages in 3 by less than 90 electrical degrees. This will put a greater load on the commutator brush circuits but this disadvantage may often be outweighed by the advantages derived from this modification. Another way of achieving the same result is by reversing the disposition of the windings 2 and 3 in the rotor slots as will be more fully explained in connection with Fig. 3.

Referring to Fig. 2, the primary three-phase winding 52 is located on the revolving member, it corresponds to the windings 23, 24 of Fig. 1. When the switch 25 is closed a flux is produced by 52 which always revolves synchronously with respect to the rotor and generates induction motor torque producing currents in the squirrel cage 2 located on the secondary, here the stator. The motor starts like an ordinary inverted polyphase induction motor, the primary revolving oppositely to the revolving flux it produces. At standstill the revolving flux revolves synchronously with respect to the secondary but as the speed of the primary increases the speed of the revolving flux correspondingly diminishes with respect to the secondary, said speed becoming zero when and if synchronism is reached. The speed of the revolving flux with respect to the primary however remains always the same and equal to the synchronous. Because of these conditions the voltages generated in the commuted winding 51 located on the primary are always of line frequency and of an amplitude which depends only on the magnitude of the revolving field. The commutator attached to 51 and the stationary two-phase arrangement of commutator brushes 35, 36, 37, 38 cooperating with same, operate to change the frequency of these two-phase auxiliary voltages with changing speed of the primary or with changing speed of the revolving flux with respect to the stator. The winding 51 is here the source of the auxiliary voltages; as these appear at the commutator brushes they are always of slip frequency.

These auxiliary voltages of slip frequency are impressed on the coils 42, 43 and 42', 43' of the two automatic switches adapted to control the circuits of the secondary windings 3' and 3''. When the motor primary is directly connected to the line at starting, as in Fig. 2, the revolving field soon reaches its normal value and for our present purpose it may be looked upon as constant. On this assumption the amplitude of the auxiliary voltages remains constant during the greater and certainly during the latter part of the starting period and their periodicity diminishes with increasing motor speed. The coils 42, 43 and 42', 43' are dimensioned to produce a sufficient pull on the switch plungers to overcome the weights 47 and 50 and thus close the switches 48, 53 at a predetermined periodicity which is lower than the periodicity of the supply, that is at a rotor speed other than zero and usually at one which is near the synchronous. The two coils 42, 43 or 42', 43', used to control the switch blades 53 and 48 respectively carry currents displaced by 90 degrees for the purpose of making the electromagnetic pull on each switch plunger practically uniform at any periodicity.

When the automatic switches close the two-phase slip frequency auxiliary voltages appearing at the brushes 38, 36 and 35, 37 are impressed on the secondary windings 3', 3'' which correspond to the winding 3 of Fig. 1, the motor reaches its full speed and at least part of the revolving flux of the motor is now produced from the secondary instead of from the primary as was the case during the starting operation. To secure about unity power factor all of the revolving flux has usually to be produced from the secondary. In order to secure the correct excitation on the secondary the axis of a secondary winding connected to a pair of brushes cooperating with the commuted winding on the primary must be displaced by about 90 electrical degrees from the axis of said brushes. More broadly the phase of the auxiliary voltage must lead by about 90 degrees the phase of the working voltage generated by the revolving flux in the secondary winding on which said auxiliary voltage is impressed. With this phase relation between auxiliary and generated working voltage some additional means must be employed if it is desired to keep the secondary exciting currents about constant and the exciting windings 3', 3'' free from working currents. In Fig. 2 these means consist in locating the squirrel cage 2, which is the secondary working winding between the primary winding 52 and the secondary exciting windings 3', 3''.

Here again the starting torque is increased and the starting current reduced by producing the revolving flux from the primary at starting, while leaving the secondary revolving flux producing circuits open, and producing the said revolving flux from the secondary after the motor has reached a sufficient speed. By adjusting the magnitude of the secondary excitation the power factor of the motor can be adjusted to any value or degree within reason.

Here as in Fig. 1, the resistance of the squirrel cage 2 can be chosen higher than the value it should have in order to yield the maximum rated output of the motor when the revolving field of the machine is produced from the stator only as is usual, in which case the starting torque per ampere will be increased without having to reduce the maximum rated output of the motor as has been fully explained in connection with Figs. 1 and 4.

The arrangement of Fig. 3 differs from that of Fig. 1 in that the commuted or secondary exciting winding 3 lies in the upper part of the rotor slots, near the periphery of the rotor and near the air gap, while the squirrel cage lies near the bottom of the rotor slots. It further differs in that the axes of the auxiliary windings 32, 33 which are here the sources of the auxiliary line frequency voltages are not in quadrature relation to the axes of the commutator brushes to which they are connected but are so displaced as to make available auxiliary voltages which lead by more than 90 degrees the working voltages generated in 3 by the revolving flux of the motor and appearing as line frequency voltages at the commutator brushes 4, 6 and 5, 7 respectively. This phase relation introduces an exciting as well as a working-voltage-opposing-component into the secondary exciting circuits of the winding 3. If these auxiliary voltages are not regulated as to magnitude all working currents will be excluded from 3 strictly speaking at but one motor load. Regulation can be omitted by omitting the variable positive reactances 30, 31, built in the form of series transformers.

If it is desired to eliminate all working currents from the winding 3 at a plurality of loads then the variable reactances 30, 31 are used as shown and so dimensioned that their impedance diminishes with increasing load as has been heretofore fully disclosed by me.

This embodiment can be operated according to the methods explained in connection with Figs. 1 and 2. With the arrangement just as shown in Fig. 3, switches 25' and 25" are closed to start the motor, the switch 34 remaining open. The squirrel cage 2 can be dimensioned as is usual in ordinary polyphase induction motor practice or it can be given a higher resistance as explained in connection with Figs. 1, 2 and 5. Because the squirrel cage lies in the bottom of the rotor slots in Fig. 3 the inductive relation between 23, 24 and 2 is not as good as for instance in Fig. 1 and this further helps to reduce the starting current. After the motor has reached a sufficient speed switch 34 is closed, the revolving field is now produced from the rotor and the maximum torque increases beyond the value which can be obtained with the same squirrel cage when producing the revolving flux from the stator, as was done at starting. At the same time the variable positive reactances 30, 31 automatically so affect the phase and magnitude of the voltages actually impressed on the commutator brushes, as distinguished from the voltages of practically constant phase and magnitude appearing at the terminals of the sources 32, 33, that while the exciting components of the auxiliary voltages at the brushes remain practically constant in magnitude and phase and lead the corresponding working voltages in 3 by about 90 degrees, quadrature components of the voltages impressed on the commutator brushes lead the exciting components of said voltages by about 90 degrees, thus opposing the corresponding working voltage components, and increase at about the same rate as said working voltage components. In this manner the current in the exciting winding 3 of Fig. 3 can be kept practically constant by keeping 3 free of working currents over any desired range of motor loads.

As previously stated this method can be applied with or without the use of the variable reactances 30, 31. If 30 and 31 are omitted then, with the auxiliary windings 32, 33 set to produce auxiliary voltages leading the corresponding working voltages in 3, the winding 3 will be absolutely freed from load currents at but one load, it will however be practically free from load currents at a plurality of loads.

If, in Fig. 3 it is desired to have the secondary exciting winding 3 carry part of the secondary load currents at all loads then this can be done for instance by locating the axis of the auxiliary windings at about 90 electrical degrees with respect to the corresponding brush axis, as shown in Fig. 1. In other words it is then sufficient for the auxiliary voltages to be plain exciting voltages and to lead the corresponding working voltages in 3 by about 90 degrees instead of by a greater angle.

It is known that a squirrel cage is nothing but a shortcircuited polyphase winding the number of phases of which is determined by the number of squirrel cage bars and the number of poles of the motor. It is really nothing but a special case of a closed multi-phase winding. Equivalent and frequently used arrangements, comprise for instance, a plurality of overlapping coils of preferably bare wire each coil forming an independent closed circuit; a distributed winding, such as a commuted winding, in which all or a plurality of coils are shortcircuited; or an ordinary two, three or n-phase winding closed at four three or n points. The exact form of the winding 2 is immaterial just so it is a multiphase winding which is closed or which can be closed to permit of the flow of induced currents. In most cases the plain squirrel cage or the bare, individually shortcircuited, coils will be used because they are the more rugged and occupy less space than other forms of equivalent secondary windings.

The source of the auxiliary voltages is immaterial just so it complies with the requirements set forth in this specification.

Throughout this specification the term primary member is applied to that member which carries the windings connected to the supply, which windings carry the line working currents, and whether or not these primary windings produce the revolving flux of the motor which flux always revolves synchronously with respect to the primary member. The other member is referred to as secondary, whether or not it carries a winding or windings which produce all or a part of the revolving flux.

It is well known that any motor can be operated as a generator provided it be driven by a prime mover at a suitable speed, and it is also generally recognized that non-synchronous polyphase motors are no exception to this rule. It is further known that in the case of an asynchronous motor the voltages generated by the primary flux in any winding on the secondary change their direction when the machine passes from sub- to super-synchronous speeds, thereby causing the machine to send working currents back to the line instead of drawing such currents from the supply. To keep the exciting circuits free from other than exciting currents is, of course, desirable whether the machine operates as a motor or as a generator. It is, therefore, to be understood that the terms used with reference to motor structures and operation are employed descriptively rather than limitatively.

While theories have been advanced as to operation of the machines and methods here described, this has been done with a view to facilitating the description thereof and it is to be understood that I do not bind myself to these or any other theories.

It will be clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

What I claim is:

1. The method of operating a non-synchronous induction motor, comprising, passing phase displaced alternating currents through windings to produce a flux revolving synchronously with respect to these windings, causing the revolving flux to generate starting torque producing currents in a circuit or circuits having a certain inductive relation to the revolving flux producing windings, and thereafter producing at least part of revolving flux by passing phase displaced alternating currents through windings which are in closer inductive relation to the circuit or circuits in which the torque producing currents are generated.

2. The method of operating a non-synchronous induction motor, comprising, passing phase displaced alternating currents through windings on the primary to produce a flux revolving synchronously with respect to the primary, causing the revolving flux to generate torque producing currents in a circuit on the secondary to start the motor, and thereafter introducing phase displaced alternating currents into another circuit on the secondary to produce from that member a flux revolving at slip frequency with respect to the secondary and coaxial and codirectional with the revolving flux produced by the primary.

3. The method of operating a non-synchronous induction motor, comprising, passing phase displaced alternating currents through windings on the primary to produce a flux revolving synchronously with respect to the primary, causing the revolving flux to generate torque producing currents in a circuit on the secondary to start the motor, thereafter introducing phase displaced alternating currents into another circuit on the secondary to produce from that member at least part of the revolving flux previously produced from the primary, and maintaining the current introduced into the secondary practically constant at a plurality of motor loads.

4. The method of operating a non-synchronous induction motor, comprising, passing phase displaced alternating currents through windings on the primary to produce a flux revolving synchronously with respect to the primary, causing the revolving flux to generate torque producing currents in a circuit on the secondary to start the motor, thereafter introducing phase displaced alternating currents into a second circuit on the secondary to produce from that member at least part of the revolving flux previously produced from the primary, and excluding load currents from the second circuit on the secondary at one or more motor loads.

5. The method of operating a non-synchronous induction motor, comprising, passing phase displaced alternating currents through windings on the primary to produce a flux revolving synchronously with respect to the primary, producing alternating phase displaced auxiliary voltages, causing the revolving flux to generate torque producing currents in a circuit on the secondary to start the motor, thereafter introducing the auxiliary voltages into a second circuit on the secondary to produce from that member at least part of the revolving flux previously produced from the primary, and excluding load currents from the second circuit on the secondary at one or more motor loads.

6. In a non-synchronous motor, a primary and a secondary, a winding on the primary adapted to produce a flux revolving synchronously with respect to said primary, means for connecting the winding on the primary to the supply to start the motor, another winding on the motor adapted to produce a flux revolving synchronously with respect to the primary, means for energizing said other winding after the revolving member of the motor is in motion, and a closed phase winding on the secondary, said closed winding being in better inductive relation to the other winding on the motor than to the winding on the primary used to start the motor.

7. In a non-synchronous motor, a primary and a secondary, a polyphase winding on the primary, a closed phase winding and a second winding on the secondary, means including the polyphase winding on the primary for producing a flux revolving synchronously with respect to the primary to start the motor, means including said second winding adapted to produce a flux revolving at slip frequency with respect to the secondary and coaxial and codirectional with the revolving flux produced by the primary, and means for rendering the last named means operative after the revolving member is in motion.

8. In a non-synchronous motor, a primary and a secondary, a polyphase winding on the primary, a closed phase winding and another winding on the secondary, said phase winding being in closer inductive relation to the other winding on the secondary than to the polyphase winding on the primary, means including the polyphase winding on the primary for producing a flux revolving synchronously with respect to the primary to start the motor, and means including the other winding on the secondary for producing at least the greater part of said revolving flux from the secondary after the motor is in motion.

9. In a non-synchronous motor, a primary and a secondary, a polyphase winding on the primary, a closed phase winding and a second winding on the secondary, said phase winding being so dimensioned that when the motor is connected to full line voltage with the second secondary winding on open circuit it develops a starting torque in excess of the full load torque of the motor means including the polyphase winding on the primary for producing a flux revolving synchronously with respect to the primary to start the motor, means including said second winding adapted to produce a flux revolving at slip frequency with respect to the secondary and coaxial and codirectional with the revolving flux produced by the primary, and means for rendering the last named means operative after the revolving member is in motion.

10. In a non-synchronous motor, a primary adapted to produce a flux revolving synchronously with respect to said primary, a secondary provided with two circuits both in inductive relation with the primary and one of which is closed to permit of the flow of induced currents, a source of auxiliary polyphase voltages, means for connecting the primary to the supply to start the motor in cooperation with the closed circuit on the secondary, and means for impressing the auxiliary voltages on the other circuit on the secondary after the revolving member of the motor is in motion, said auxiliary voltages being adapted to produce in said other circuit a flux revolving at slip frequency with respect to the secondary and coaxial and codirectional with the revolving flux produced by the primary.

11. In a non-synchronous motor, a primary adapted to produce a flux revolving synchronously with respect to said primary, a secondary provided with two circuits both in inductive relation with the primary and one of which is closed to permit of the flow of induced currents, a source of auxiliary polyphase voltages, means for connecting the primary to the supply to start the motor in cooperation with the closed circuit on the secondary, and automatic means dependent on the speed of the motor for impressing the auxiliary voltages on the other circuit on the secondary after the revolving member of the motor is in motion, said auxiliary voltages being adapted to produce in said other circuit a flux revolving at slip frequency with respect to the secondary and coaxial and codirectional with the revolving flux produced by the primary.

12. In a non-synchronous motor, a primary adapted to produce a flux revolving synchronously with respect to said primary, a secondary provided with two circuits both in inductive relation with the primary and one of which is closed to permit of the flow of induced currents, a source of auxiliary polyphase voltages, means for connecting the primary to the supply to start the motor in cooperation with the closed circuit on the secondary, means for impressing the auxiliary voltages on the other circuit on the secondary after the revolving member of the motor is in motion for the purpose of producing at least part of the said revolving flux from the secondary, and means for excluding load currents from said other circuit for at least one motor load.

13. In a non-synchronous motor, a primary adapted to produce a flux revolving synchronously with respect to said primary, a secondary, two windings on the secondary in different inductive relation to the primary, the secondary winding in the better inductive relation to the primary being closed to permit of the flow of induced currents and so dimensioned that when the motor is connected to full line voltage with the second secondary winding on open circuit it develops a starting torque in excess of the full load torque of the motor, a source of auxiliary polyphase voltages, means for connecting the primary to the supply to start the motor in cooperation with the closed winding on the secondary, and means for impressing the auxiliary voltages on the second secondary winding after the revolving member of the motor is in motion, said auxiliary voltages being adapted to produce in said second circuit a flux revolving at slip frequency with respect to the secondary and coaxial and codirectional with the revolving flux produced by the primary.

14. In a non-synchronous motor, a primary adapted to produce a flux revolving synchronously with respect to said primary, a secondary with two windings each in inductive relation to the primary, one of said secondary windings being closed to permit of the flow of induced currents and so dimensioned that when the motor is connected to full line voltage with the second secondary winding on open circuit it develops a starting torque in excess of the full load torque of the motor, a source of auxiliary polyphase voltages, means for connecting the primary to the supply to start the motor with the help of the closed winding on the secondary, means for impressing the auxiliary voltages on the second secondary winding after the revolving member of the motor is in motion, said auxiliary voltages being adapted to produce in said second circuit a flux revolving at slip frequency with respect to the secondary and coaxial and co-directional with the revolving flux produced by the primary, and means for excluding load currents from said second secondary winding for at least one motor load.

15. In a non-synchronous motor, a primary adapted to produce a flux revolving synchronously with respect to said primary, a secondary provided with a squirrel cage and a second winding both in inductive relation with the primary, said squirrel cage being so dimensioned that when the motor is connected to full line voltage with the second secondary winding on open circuit it develops a starting torque in excess of the full load torque of the motor, a source of polyphase currents integral with the motor, means for connecting the primary to the supply to start the motor in cooperation with the squirrel cage, and means for connecting the said source to the second winding on the secondary after the revolving member of the motor is in motion, said means being adapted to conduce into said other winding polyphase currents of slip frequency and of such phase and magnitude as to produce at least part of the said revolving flux from the secondary.

16. In a non-synchronous motor, a primary adapted to produce a flux revolving synchronously with respect to said primary, a secondary provided with a squirrel cage and a second winding both in inductive relation to the primary, said squirrel cage being so dimensioned that when the motor is connected to the full line voltage with the second secondary winding on open circuit it develops a starting torque in excess of the full load torque of the motor, a source of polyphase currents integral with the motor, means for connecting the primary to the supply to start the motor in cooperation with the squirrel cage, means for connecting the said source to the other winding on the secondary after the revolving member of the motor is in motion, said means being adapted to conduce into said other winding polyphase currents of slip frequency and of such phase and magnitude as to produce at least part of the said revolving flux from the secondary, and means for excluding load currents from said other circuit for at least one motor load.

17. In a non-synchrononous motor, a primary adapted to produce a flux revolving synchronously with respect to said primary, a secondary provided with a closed phase winding and a commuted winding in inductive relation to the primary, brushes carried by the primary and cooperating with the commuted winding, a source of auxiliary polyphase voltages, means for connecting the primary to the supply to start the motor by generating currents in said phase winding, and means for connecting the commutator brushes to the source of auxiliary voltages after the revolving member of the motor is in motion to produce a flux revolving at slip frequency with respect to the secondary and coaxial and codirectional with the revolving flux produced by the primary.

18. In a non-synchronous motor, a primary adapted to produce a flux revolving synchronously with respect to said primary, a secondary provided with a closed phase winding and a commuted winding in inductive relation to the primary, brushes carried by the primary and cooperating with the commuted winding, a source of auxiliary polyphase voltages, means for connecting the primary to the supply to start the motor by generating currents in said phase winding, means for connecting the commutator brushes to the source of auxiliary voltages after the revolving member of the motor is in motion to produce at least part of the said revolving flux from the secondary, and means for maintaining the current in the commuted winding practically constant at a plurality of motor loads.

19. In a non-synchronous motor, a primary adapted to produce a flux revolving synchronously with respect to said primary, a secondary provided with a squirrel cage and a commuted winding in inductive relation to the primary, brushes carried by the primary and cooperating with the commuted winding, a source of auxiliary polyphase voltages, means for connecting the primary to the supply to start the motor by generating currents in said squirrel cage, and means for connecting the commutator brushes to the source of auxiliary voltages after the revolving member of the motor is in motion to produce a flux revolving at slip frequency with respect to the secondary and coaxial and codirectional with the revolving flux produced by the primary.

20. In a non-synchronous motor, a primary adapted to produce a flux revolving synchronously with respect to said primary, a secondary provided with a closed phase winding and a distributed winding, said phase winding being located between the primary and the distributed winding, a source of auxiliary polyphase voltages, means for connecting the primary to the supply to start the motor by generating currents in said phase winding, and means for connecting the distributed winding to the source of auxiliary voltages after the motor is in motion to produce a flux revolving at slip frequency with respect to the secondary and coaxial and codirectional with the revolving flux produced by the primary.

In testimony whereof I affix my signature this 2nd day of April, 1926.

VALÈRE A. FYNN.